ID

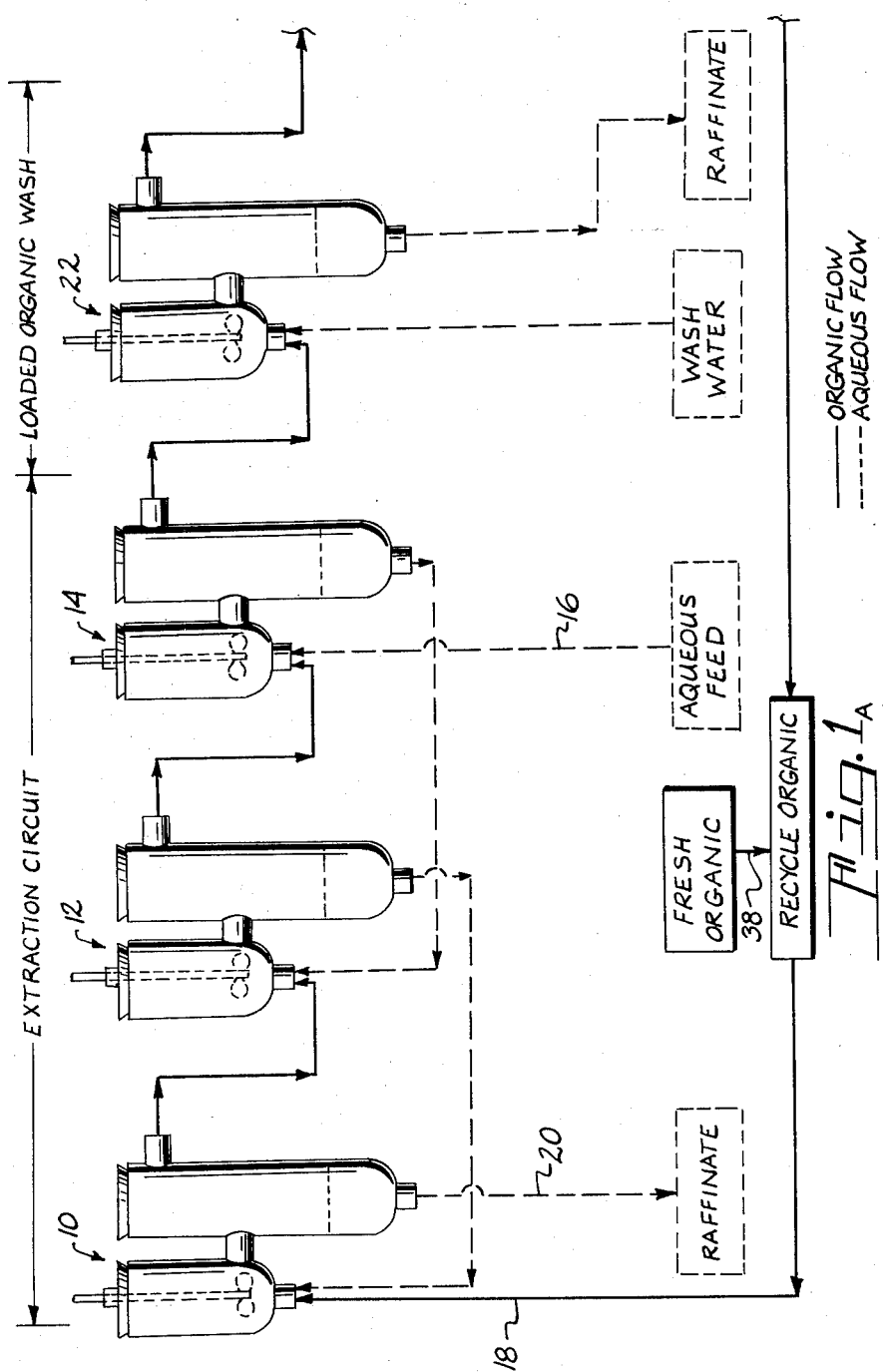

United States Patent Office 3,798,305
Patented Mar. 19, 1974

3,798,305
RECOVERING RHENIUM VALUES FROM ORGANIC EXTRACTANT SOLUTIONS
L. Rita Pagnozzi, James C. Patton, Jr., and Martin B. MacInnis, Towanda, Pa., assignors to GTE Sylvania Incorporated, Seneca Falls, N.Y.
Filed May 19, 1972, Ser. No. 255,234
Int. Cl. C01g 47/00, 39/00
U.S. Cl. 423—49                        3 Claims

ABSTRACT OF THE DISCLOSURE

A process is disclosed wherein essentially all of the rhenium can be recovered from organic extractant solutions which selectively extract rhenium from aqueous solutions containing molybdenum A stripping solution of nitric acid removes the rhenium and can be recycled to obtain a high concentration of rhenium in the stripping solution.

CROSS-REFERENCES TO RELATED APPLICATIONS

Co-pending U.S. patent applications Ser. No. 255,233 and Ser. No. 255,232, respectively filed concurrently herewith and assigned to the same assignee as the present invention, disclose improvements in the selective extraction system for extracting rhenium from aqueous solutions containing molybdenum.

BACKGROUND OF THE INVENTION

Field of the invention

This invention relates to an improved process for the recovery of rhenium values from organic extractant solutions containing same. In particular, it relates to a process for the recovery of rhenium from organic extractant solutions without an appreciable loss of rhenium.

Prior art

Rhenium is often present in small amounts in molybdenite concentrates such as in the molybdenite concentrates formed as a by-product from the recovery of copper from copper-bearing ores. Efficient recovery of rhenium values can aid appreciably in lowering overall manufacturing costs. Usually these concentrates are roasted to recover the molybdenum as molybdenum oxide and the rhenium values are volatilized. The rhenium values are then recovered from the flue dusts and gases by contacting them with water or some other solvent, such as an acidic or basic medium. The rhenium values are then extracted from such rhenium bearing solutions by ion-exchange. According to U.S. Pat. No. 2,876,065, the impure clarified rhenium solution is passed through ion-exchange equipment in intimate contact with a strongly basic alkylamine-type synthetic resin. Examples of commercially available resins are Amberlite IRA-400 and Dowex 1X8. After eluting to remove molybdenum and other impurities, the rhenium is eluted with a strong mineral acid such as perchloric acid. Rhenium sulfide ($Re_2S_7$) is precipitated from the rhenium-bearing acid solution by $H_2S$ gas. The rhenium sulfide is then oxidized and converted to $NH_4ReO_4$ by the addition of $NH_4OH$. The $NH_4ReO_4$ is crystallized by evaporation.

A similar process is disclosed in U.S. Pat. 3,244,475 except that a liquid ion exchange material is used instead of an ion exchange resin to recover the rhenium. The rhenium values are recovered from the aqueous solution by means of a quaternary ammonium compound carried in kerosene with primary decylalcohol as the solubilizer. The amine is stripped with dilute perchloric acid and $NH_4ReO_4$ is recovered in much the same manner as is disclosed in U.S. Pat. 2,876,065.

U.S. Pat. 3,558,268 discloses a process similar to the above processes in which ammonium thiocyanate ($NH_4SCN$) is used as the stripping agent and crystallization of $NH_4ReO_4$ directly from the $NH_4SCN$ solution is disclosed, thereby eliminating the sulfide precipitation and oxidation steps.

There are several disadvantages with the foregoing processes which result in recovery appreciably less than all of the rhenium initially present in the solutions. For example, the molybdenum must be separated from the rhenium by roasting prior to the recovery of rhenium and that technique generally results in up to about 50% loss of rhenium. Additionally, after the recovery of rhenium by the extraction processes mentioned, the discarded raffinate contains 0.01 g. Re/l. This concentration is often higher than that found in some concentrates. Also, reuse of the organic solution in the salt from perchlorate, thiocyanate, etc. which result after stripping with the agents disclosed, sharply lowers the extraction coefficients. The decrease in the extraction capacity with use is believed to be associated with the insolubility of the loaded amine in the decylalcohol-amine-kerosene system. Since the extracting capacity decreases with use, and it becomes necessary to replace the organic or lose appreciable amounts of rhenium which adds appreciably to the recovery costs or lowers yields.

It is believed, therefore, that a process then enables recovery of essentially all of the rhenium from an organic extraction solution and in which the stripping solution can be recycled to obtain a relatively high rhenium concentration is an advancement in the art.

OBJECTS AND SUMMARY OF THE INVENTION

It is an object of this invention to provide a more efficient process for recovering rhenium from organic extractant solutions used to extract rhenium from molybdenum containing solutions.

It is another object of this invention to provide an improved stripping solution for rhenium from organic extractant solutions.

It is a further object of this invention to provide a process which enables the recovery of rhenium without an appreciable loss of rhenium to the raffinate.

It is still another object of this invention to provide a process which will recover rhenium from solutions containing relatively low concentrations of rhenium and relatively high concentrations of molybdenum.

These and other objects are achieved in one aspect of this invention which consists essentially of selectively extracting rhenium from an alkali molybdate aqueous solution by a quaternary ammonium compound dissolved in an appropriate solvent and stripping essentially all of the rhenium from the loaded organic by an aqueous solution of nitric acid.

BRIEF DESCRIPTION OF THE DRAWING

The drawing is a flow sheet illustrating the invention.

DETAILED DESCRIPTION OF THE PREFERRED EMBODIMENTS

Figure 1:
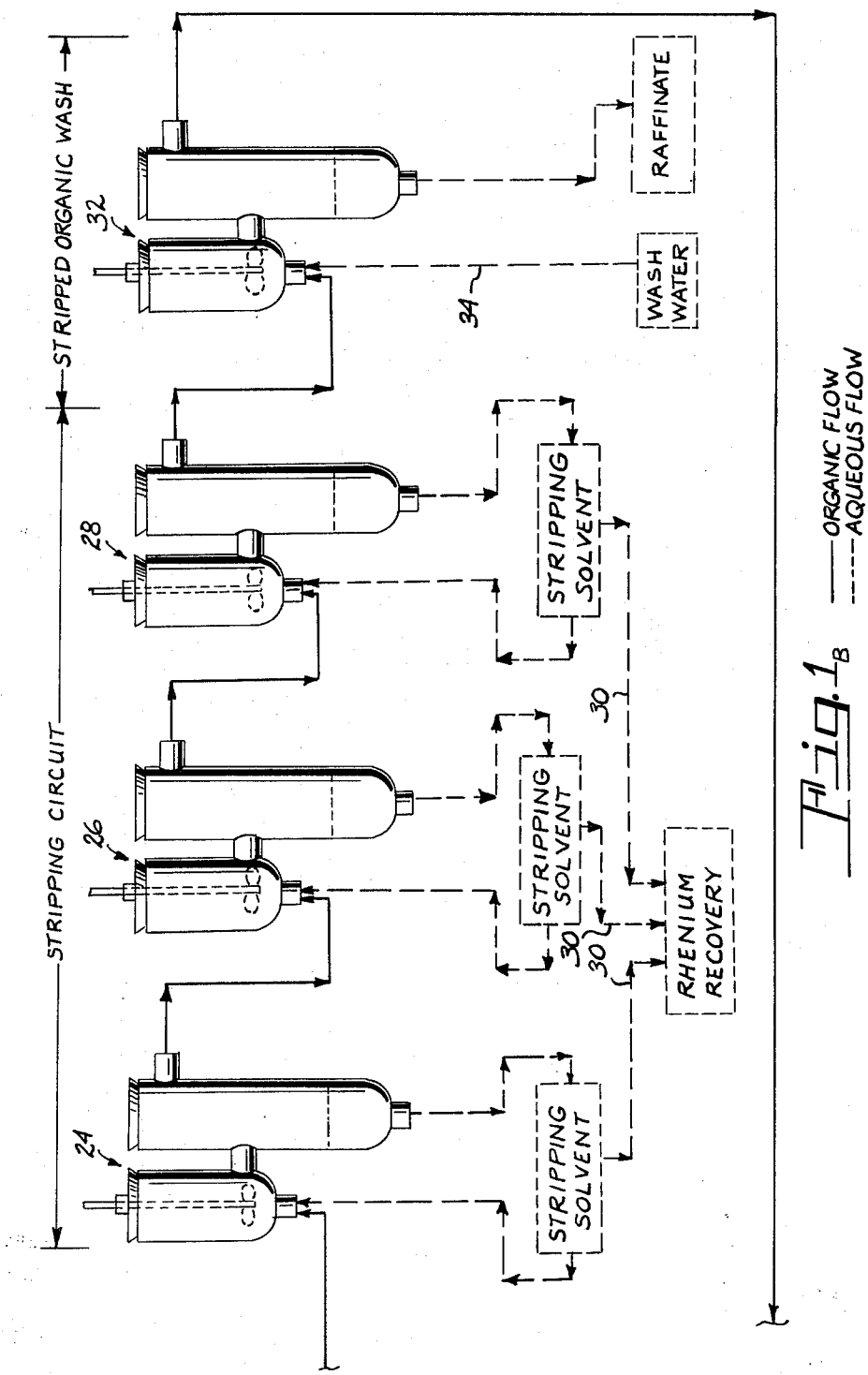

For a better understanding of the present invention, together with other and further objects, advantages and capabilities thereof, reference is made to the following disclosure and appended claims in connection with the above description of some of the aspects of the invention.

The active organic extractant is a quaternary ammonium compound such as that disclosed in U.S. Pat. 3,244,475 of the formula $[R_3(CH_3)N]^+A^-$ in which R is an alkyl group having from about 8 to about 10 carbon atoms and A is an anion derived from mineral acids such as hydrochloric, nitric, and the like. R can be mixed hydrocarbons of the desired chain length as well as those having a specific chain length. For example, tricaprylyl monomethyl ammonium chloride and tricaprylyl monomethyl ammonium nitrate are preferred. It is to be noted that if A⁻ is other than nitrate it will be converted to the nitrate upon contact with the stripping solution.

One of the numerous advantages of the present invention is that the number of stripping stages can be reduced and still recover essentially all of the rhenium in the extractant solution. For example, when the prior art stripping agents were used about 5 stages were needed to achieve complete stripping under a given set of flow conditions, ratios of stripping solutions and organic extractant solution. By utilizing this invention, only 3 stages are required to perform the same degree of removal of rhenium from the organic under the same conditions.

As previously mentioned, the organic extractant solutions disclosed in the beforementioned co-pending applications S.N. 255,233 and S.N. 255,232, respectively, can be effectively stripped using the stripping solution of this invention.

The volumetric ratio of the organic extractant solution to the stripping solution is generally from about 1:10 to about 10:1. The concentration of the nitric can vary from about 0.5 N to about 15 N with from about 3 to about 5 N being preferred. Although the concentration of rhenium can be varied depending upon the amount of recycling desired, the stripping solution is preferably recycled until the rhenium concentration reaches at least about 30 g./liter.

To more fully illustrate the invention, particular reference is made to the drawing which shows a typical flow sheet embodying extraction stripping and wash sections. With reference to the extraction section which has three units 10, 12 and 14, the aqueous feed solution 16 containing about 30 milligrams per liter of rhenium and about 66 grams of molybdenum/liter enters extraction unit 14 at the rate of about 41 ml./min. and the organic extractant solution 18 enters unit 10 at the rate of about 12.5 ml./min. The extractant solution contains about 0.1% by volume of tricaprylyl monomethyl amine, 0.2% by volume of primary decyl alcohol and the remainder kerosene. Countercurrent flow is established and the raffinate 20 essentially barren of rhenium and containing the molybdenum values. This stream is processed further to recover the molybdenum therefrom. The organic solution exits from extraction unit 14 and can enter wash unit 22 or can be sent direct to the first of three stripping units, 24, 26 and 28. A 4 N nitric acid stripping solution enters each individual stripping unit 24, 26 and 28, is recycled until the desired concentration is reached. The flow rate of the stripping solution is about 8.3 ml./min. The rhenium rich product stream 30 containing up to at least about 30 gram/liter of rhenium exits from the stripping section. The organic enters the second wash unit 32 where it is contacted with water stream 34 at the rate of about 5.8 ml./min. to remove any water soluble impurities therefrom. The wash organic is recycled to unit 18 and if desired fresh organic extractant 38 can be added depending upon the extraction efficiency of the recycled organic solution and the organic solution used.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process wherein an aqueous solution containing a relatively high concentration of molybdenum and a relatively low concentration of rhenium is contacted by an organic extractant solution wherein the active extracting agent is a quaternary ammonium compound dissolved in an organic solvent to preferentially extract essentially all of the rhenium without an appreciable extraction of molybdenum into the organic solution and thereafter the organic and aqueous solutions are separated and the rhenium values are recovered from the organic phase, the improvement comprising:
   (a) contacting said organic extractant solution with a sufficient amount of an aqueous solution of nitric acid, having a concentration of from about 0.5 to about 15 N, to remove essentially all of the rhenium from said organic solution into said nitric acid solution and to maintain a volumetric ratio of said organc extractant solution to said stripping solution of from about 1:10 to about 10:1 and
   (b) recovering essentially all of said rhenium values from said nitric acid solution.

2. An improvement according to claim 1 wherein said nitric acid is recycled until said nitric acid contains a rhenium concentration of at least about 30 grams per liter.

3. An improvement according to claim 2 wherein said nitric acid is from about 3 to about 5 N.

References Cited
UNITED STATES PATENTS 3,244,475  4/1966  Churchward _____ 23—312 ME
2,972,531  2/1961  Zimmerley et al. __ 75—101 BE

OTHER REFERENCES

Coleman et al., "Proceedings of International Conference on Peaceful Uses of Atomic Energy," vol. 28, pp. 278-288, 1958.

HERBERT T. CARTER, Primary Examiner

U.S. Cl. X.R.

423—54; 75—101 BE; 23—312 ME